United States Patent
Logan et al.

(10) Patent No.: US 12,344,198 B1
(45) Date of Patent: Jul. 1, 2025

(54) RAIN DETECTION USING EXTERIOR MICROPHONES

(71) Applicant: Zoox, Inc., Foster City, CA (US)

(72) Inventors: David Donald Logan, Morgan Hill, CA (US); Nehemia Girma Terefe, Foster City, CA (US); Xuan Zhong, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 43 days.

(21) Appl. No.: 18/470,676

(22) Filed: Sep. 20, 2023

(51) Int. Cl.
*B60S 1/08* (2006.01)
*H04R 1/08* (2006.01)

(52) U.S. Cl.
CPC .......... B60S 1/0859 (2013.01); H04R 1/086 (2013.01); H04R 2499/13 (2013.01)

(58) Field of Classification Search
None
See application file for complete search history.

(56) References Cited

U.S. PATENT DOCUMENTS

| | | | |
|---|---|---|---|
| 6,771,788 B1* | 8/2004 | Soutar | H04R 1/083 381/189 |
| 6,774,356 B2* | 8/2004 | Heslin | B60S 1/0881 250/214 AL |
| 11,729,538 B2* | 8/2023 | Chng | H04R 9/08 381/325 |
| 12,003,929 B1* | 6/2024 | Zhong | B08B 7/02 |
| 12,049,199 B2* | 7/2024 | Khamis | B60S 1/026 |
| 2004/0264016 A1* | 12/2004 | Ostreko | B60R 1/04 359/879 |
| 2005/0114128 A1* | 5/2005 | Hetherington | G10L 21/0208 704/233 |
| 2010/0277821 A1* | 11/2010 | Roth | B60R 1/04 359/872 |
| 2012/0213399 A1* | 8/2012 | Li | H04R 1/086 381/365 |
| 2016/0234356 A1* | 8/2016 | Thomas | H04K 3/84 |
| 2016/0234594 A1* | 8/2016 | Ogura | B60R 11/0247 |
| 2020/0112782 A1* | 4/2020 | Kargus, IV | H04R 1/04 |
| 2020/0396539 A1* | 12/2020 | Vitt | H04R 3/005 |
| 2021/0163129 A1* | 6/2021 | Thomas | B64C 33/02 |

(Continued)

FOREIGN PATENT DOCUMENTS

| | | |
|---|---|---|
| JP | 2021-530394 A | 11/2021 |
| KR | 10-2021-0015194 A | 2/2021 |

(Continued)

OTHER PUBLICATIONS

International Search Report and Written Opinion dated Mar. 31, 2025 for International PCT Application No. PCT/US2024/060384.

*Primary Examiner* — Fekadeselassie Girma
(74) *Attorney, Agent, or Firm* — EIP US LLP

(57) ABSTRACT

A method includes receiving an audio signal from a microphone and processing the audio signal to identify a signal component that is associated with a resonance of at least part of a microphone unit disposed on a vehicle. The microphone unit includes the microphone and a protective element arranged to shield the microphone from environmental material. The method includes determining, based at least in part on the identified signal components, a characteristic indicative of the protective element having shielded the microphone from environmental material.

20 Claims, 8 Drawing Sheets

(56) References Cited

U.S. PATENT DOCUMENTS

| | | | | |
|---|---|---|---|---|
| 2021/0258672 A1* | 8/2021 | Banter | | H04R 1/086 |
| 2022/0155429 A1* | 5/2022 | Kobayashi | | G01S 15/931 |
| 2022/0187448 A1* | 6/2022 | Shand | | G01S 13/931 |
| 2022/0417627 A1* | 12/2022 | Marron-Baez | | B60K 35/50 |
| 2024/0080631 A1* | 3/2024 | Guha | | B81B 7/0058 |

FOREIGN PATENT DOCUMENTS

| | | |
|---|---|---|
| KR | 10-2022-0013579 A | 2/2022 |
| KR | 10-2022-0036453 A | 3/2022 |
| WO | 2022236783 A1 | 11/2022 |

\* cited by examiner

RAIN DETECTION USING EXTERIOR MICROPHONES

BACKGROUND

Vehicles, and especially road-going vehicles, are designed to operate in a range of weather conditions. Users may expect to be able to travel in bright sunlight, in windy conditions, or during a rainstorm. Rain may change how a vehicle handles on the road, as well as potentially obscuring the vision of a user and/or affecting an ability of sensors of the vehicle to accurately take readings. In manual vehicles, a driver of the vehicle may be responsible for controlling windshield wipers to prevent the driver's vision from being obscured. Some vehicles incorporate "rain sensors" that use changes in reflections of infrared light to determine the presence of rainwater, or other liquid, on a windshield and to control the windshield wipers automatically.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
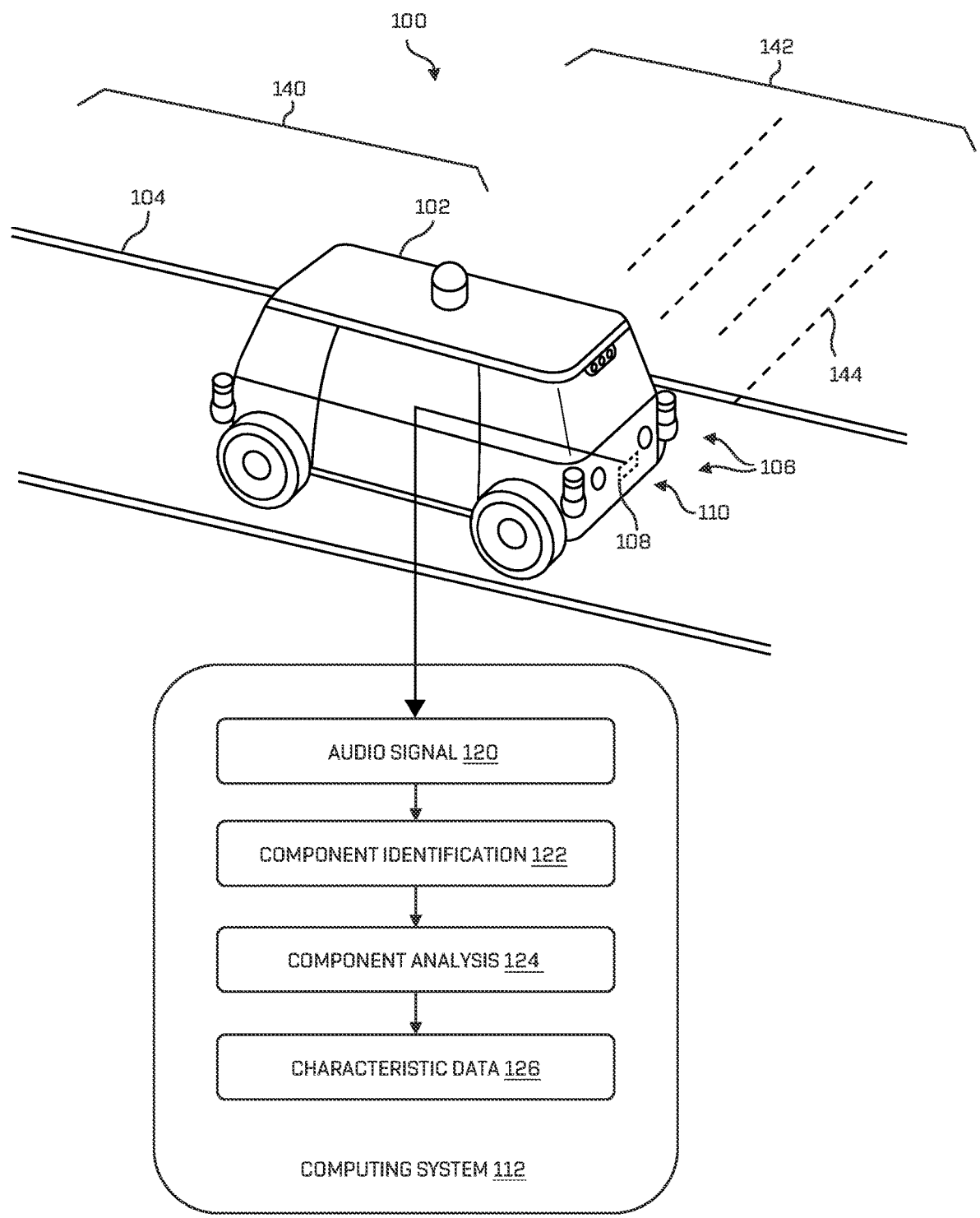
FIG. 1 is a pictorial diagram of a process for detecting rain using an exterior microphone according to the present invention.

It is useful for a vehicle to be able to operate during precipitation such as rainfall. This application relates to techniques including methods, systems, and computer-readable media for detecting rainfall on or close to a vehicle. The techniques make use of one or more microphones of the vehicle to detect and/or quantify the rainfall. The techniques described herein may also be applied to detect other precipitation or other material using the one or more microphones. For example, the techniques may be applied to detect falling snow, hail, or sleet, to detect the presence of liquids other than rainwater, and/or to detect dust, sand, or other precipitate or particulate matter that may be present in an environment through which the vehicle is travelling, such as insects. Collectively, rain, other precipitation, and other material may be referred to as environmental or atmospheric material.

Understanding when it is raining, how long it has been raining for, and, where possible, the intensity of the rainfall, may be useful for determining how a vehicle may handle while travelling across a surface, such as a road. Vehicle handling may differ between different surface types, and such handling may be affected by the surface being wet to different extents. For example, light rain may cause only a small change in handling on asphalt as it becomes damp and therefore may cause only a slight change in, e.g., braking distances, whereas heavy rain may cause water to pool on the surface, which may significantly change how the vehicle handles. Similarly, different durations of rain may affect the handling and operation of the vehicle by causing different amounts of water to accumulate on a surface. Understanding the rainfall may also enable an understanding to be gained of how the vision of one or more users may be impacted and to determine whether wipers and/or heaters should be operated to mitigate this. Rainfall or other precipitation may affect the performance of various sensors used by a vehicle for the purpose of autonomous driving. An understanding of the rainfall may therefore be used to determine whether and how often such sensors require cleaning to continue to operate effectively, and to implement suitable cleaning techniques In vehicles having a human operator within the vehicle, such as manual or semi-autonomous vehicles, understanding the rain may be useful to provide some automatic function to assist the operator, such as automatically operating wipers to clear a windshield. In autonomous vehicles, without a human operator, understanding rainfall may be critical to allowing the vehicle to continue operation, by adjusting its systems to account for the rainfall. For example, different hardware or software modules for tasks such as prediction, planning, or perception of the environment, may be activated, or parameter values of such modules may be modified, in different precipitation conditions.

In some examples, vehicles may incorporate 'rain sensors'. Rain sensors may utilize reflections of infrared light to determine when water or another liquid is present on a windshield of the vehicle. Such sensors may therefore be used to determine whether liquid or debris is present on a windshield. However, such sensors are typically only useful for detecting liquids or debris on transparent surfaces, and may be unable to accurately differentiate between ongoing rainfall and other liquids on the surface, such as caused by splashes from puddles, limiting their usefulness in the context of autonomous driving. Moreover, rain sensors may require precise and widespread placement to be usable in such applications, which may not be feasible within an autonomous vehicle. Various other types of sensors, such as image sensors, may also be used or adapted for detecting rainfall, but use of such sensors typically results in low accuracy and/or involves complex data processing involving a relatively high processing and/or memory cost, and may also be unable to distinguish between ongoing rainfall and wet environmental conditions. Some of the shortcomings described above may be partially alleviated by supplementing data generated by sensors with local weather report data obtained via wireless communication means, but such data may also be insufficient due to lacking the required level of accuracy or geographic/temporal localization, as well as potentially introducing an unacceptable degree of latency.

The techniques described herein provide one or more sensors that enable rainfall on or close to a vehicle to be determined in real time, and which may enable the rainfall to be categorized and/or quantified. To make such determinations, the techniques can utilize one or more audio sensors, comprising a microphone or a plurality of microphones, that may be disposed on an exterior of a vehicle or otherwise provided with a conduit or channel providing fluid communication between the microphone(s) and the outside environment. Such microphones may be used for one or more other purposes. For example, a vehicle may incorporate one or more microphones configured to detect audio signals corresponding to sirens from emergency vehicles, so that the vehicle may be operated to give way to the emergency vehicle. In some examples, one or more microphones of a vehicle may be configured to detect audio signals that indicate impacts on a body of the vehicle. As a result of utilizing microphones for rainfall detection, efficient use is made of the sensors, and the need to incorporate new, specific sensors for rain detection may be avoided. As noted above, while a vehicle may additionally include other sensors such as image sensors or cameras for use in autonomous driving, use of such sensors for rain detection has proven less accurate, more complex, and more processor-intensive than methods according to the present disclosure. Although the techniques herein refer to microphones provided on a vehicle, the techniques are applicable to determining rainfall using microphones mounted to other structures or objects.

Rainfall may be detected based on properties of a microphone and the assembly or unit in which it is provided. Specifically, a microphone unit, which may comprise a housing and one or more protective elements such as a protective mesh may delimited an air-filled cavity that exhibits a resonance associated with a natural frequency of air moving in and out of the cavity. Sound from an environment in which the vehicle is travelling may excite the resonance and this may be picked up by the microphone. The frequency of the resonance, as picked up by the microphone, may show a higher amplitude, when frequency analysis is performed. The presence of water and the amount of water in contact with the microphone unit may cause a different resonance frequency compared to when the microphone unit is dry, which may result from the water plugging perforations in the protective mesh and therefore changing the dynamics of air moving in and out of the cavity and its associated natural frequency. In addition, raindrops hitting the microphone unit may change the amount of water in contact with the microphone, meaning that how often the resonance frequency changes and/or the amount by which the frequency changes may also be analyzed to quantify or categorize rainfall. Yet further, those raindrops may also create noise and/or excite the resonance of the microphone unit when they strike the microphone unit, enabling detection of individual droplets striking the microphone unit. Individually, or together, each of these different indicators may be used to determine characteristics of rainfall in the vicinity of the vehicle, such as when rain is falling close to or on the microphone unit, how hard the rain is falling, and/or the absolute or relative direction of the rain.

When provided on a vehicle, it may be useful to understand an effective rain rate. The effective rain rate may be described as the intensity of the rainfall relative to the vehicle's speed. In other words, while it may be useful to take an absolute measure of how hard the rain is falling when the vehicle is stationary, when the vehicle begins to move, the movement of the vehicle through the rain may increase the intensity of the rain falling on the vehicle. The apparent increased intensity may affect how often sensor cleaning is to be performed, whether and how particular software or hardware modules are activated or modified, or how often a windshield wiper is to be operated. The effective rain rate corresponds to speed and/or direction of travel of the vehicle, and accordingly, the vehicle's speed and/or direction of travel (in other words, the vehicle's velocity) may also be taken into account when analyzing the resonances and fingerprint signals caused by raindrops as described above. The relationship between absolute rainfall characteristics and the effective rain characteristics on one or more surfaces of the vehicle may be dependent on the velocity of the vehicle, and therefore velocity of the vehicle may be used as an additional signal for quantifying rainfall levels.

According to an aspect of the disclosed technology, therefore, there is provided a method comprising receiving an audio signal from a microphone, processing the audio signal to identify a signal component that is associated with a resonance of at least part of a microphone unit disposed on a vehicle and comprising the microphone and a protective element arranged to shield the microphone from environmental material, and determining a characteristic indicative of the protective element having shielded the microphone from environmental material based at least in part on the identified signal component. The method may advantageously enable detection and characterization of said environmental material using the microphone. The use of a dedicated sensors for detecting environmental material can be avoided. The use of the microphone in this way may enable more accurate identification and characterization of the environmental material than other sensors, such as, for example, a camera. Analysis of audio signals may also require fewer computing resources than analysis of other signals, such as images, which may be especially useful in, for example, autonomous vehicles where computing resources are used for many different computations and so are to be conserved where possible.

The microphone may be positioned in an external environment, and may be mounted to a vehicle, particularly on or at an exterior surface of the vehicle. The audio signal may therefore be a recording of an external environment through which the vehicle travelled, is travelling, or in which the vehicle is stationary. The microphone may be positioned on an end of the vehicle, such as a front or a rear end. The vehicle may be a bi-directional vehicle, such that each end may act as the front or the rear end. A microphone may be provided on each end of the vehicle. The microphone may be positioned on a side of the vehicle. A microphone may be provided on each side of the vehicle.

In some examples, the protective element is perforated. The perforated protective element may have a plurality of perforations. At least a portion of the perforations may have a uniform diameter, and any two perforations may be separated by a minimum distance. In some examples, each of the plurality of perforations may have a uniform diameter. The minimum distance may be greater than 0.1 mm, greater than 0.2 mm, greater than 0.3 mm, greater than 0.4 mm, greater than 0.5 mm, or greater than 1 mm. The diameter may be greater than 0.1 mm, greater than 0.2 mm, greater than 0.3 mm, greater than 0.4 mm, greater than 0.5 mm, or greater than 1 mm. The perforated protective element may be formed wholly or partially from metal or plastic, and may be a mesh or grill. By being perforated, the protective element may allow sound to pass through it so that it can reach the microphone while also providing at least a partial barrier to debris or other environmental material such as rainwater or surface water. In some examples, the diameter of the perforations and/or the distances therebetween may be similar to average raindrop sizes, so that at least some raindrops striking the protective element are prevented from passing through the perforations. The protective element may be provided to protect the microphones from wind noise.

The signal component may comprise a component or feature of the audio signal. In one example, the signal component may be a transient temporal signal component caused by the environmental material striking or being in contact with the protective element, meaning that the presence of the signal component can be used in determining the characteristic associated with the protective element shielding the microphone from the environmental material. In another example, the identified signal component may be a frequency domain component associated with a resonance of the microphone unit, for example determined by performing a discrete Fourier transform on a portion of the audio signal within a temporal window. The resonance may be a resonance of a cavity delimited by the protective element and a housing of the microphone unit. The housing of the microphone unit may hold the protective element in a position to protect the microphone. The cavity, which may also be referred to as an air volume or chamber, may be delimited between the protective element and the microphone. The cavity may act as a Helmholtz resonator. In some examples, the microphone unit may delimit a plurality of cavities, which may individually act as Helmholtz resonators. The protective element may provide the 'neck' or 'port' of the resonator via its perforations, which may act as masses in a mass-spring model of the resonator. A microphone may also have an associated resonance.

The environmental material may affect the resonance of the cavity. The environmental material may change how the cavity is able to resonate by, for example, increasing the effective mass of the resonator, introducing damping, and/or changing which resonant modes are able to be excited. In examples where the protective element is perforated, the environmental material may fill or partially fill one or more of the perforations, which may affect which modes are able to exist. The nature of the resonance may be a function of how many perforations are filled within environmental material.

Filling a perforation with environmental material may be referred to as 'plugging' the perforation. In the example of rainfall, rainwater may plug a plurality of perforations. Perforations may become plugged when water hits the protective element, such as when splashed by water on a surface of a road or when a raindrop hits the protective element. When further raindrops hit the protective element, they may dislodge some water from some of the perforations and may plug other perforations. Perforations may also become unplugged by vibration of the protective element, as may happen when the vehicle is in motion. The extent to which the perforations are plugged may affect the frequency of the resonance, and the frequency of the resonance may therefore be used to determine the characteristic of the rainfall. The dynamic plugging and unplugging of perforations may result in changes in frequency that can also be used to determine said characteristic. For example, the determining of the characteristic may be based at least on a rate at which at which the frequency of the identified signal component changes due to variations in the extent to which the perforations of the protective mesh are plugged by water. In another example, a rate of rainfall may be determined based on how quickly the frequency of the resonance varies after protective mesh is unplugged, for example using vibrations, compressed air, or a vehicle maneuver.

In an example, the characteristic may be determined based at least in part on a frequency shift of the resonance relative to a reference frequency. The method may comprise determining the frequency shift of the resonance relative to a reference frequency. Determining the characteristic may comprise determining the frequency shift. The reference frequency may be a normal resonance frequency of the microphone unit. The reference frequency may be measured when the protective unit is free of environmental material. In other words, the reference frequency may be measured in dry conditions and/or when the vehicle is stationary.

The method may further comprise obtaining data indicating a speed of the vehicle. The speed of the vehicle may be used to determine the characteristic. The characteristic may be determined using the frequency of the resonance and the indicated speed of the vehicle within a temporal window. The resonance frequency for a given vehicle speed may depend on the rain rate in the vicinity of the vehicle, as this determines the average rate of plugging and unplugging events that have a net effect of varying the resonance frequency. Using the speed of the vehicle in addition to the frequency of the resonance may therefore enable the rain rate to be determined.

As indicated above, where the environmental material comprises rainwater or another liquid, that material may land on or near the protective element and may cause changes to the resonance. Material striking the protective element may have an audio signature or fingerprint that can be indicative of the strike, even separately from whether or not a change in resonance is caused or observed. Accordingly, as part of the method, the signal component may be associated with a reverberation or another feature caused by a liquid droplet landing on, striking, or hitting the protective element or another nearby surface. The characteristic may be determined based at least in part on a rate of signal components that are associated with reverberations caused by liquid droplets landing on the protective element. The method may comprise determining the occurrence rate of the signal components that are associated with reverberations caused by liquid droplets landing on the protective element. Determining the characteristic may comprise determining the occurrence rate of the signal components that are associated with reverberations caused by liquid droplets landing on the protective element. In other words, how often the liquid droplets land on the protective element may be indicative of, for example, a rate or intensity of the rainfall, whether it is an absolute rate or a relative or effective rate. Although liquid droplets are referred to here, the characteristic may be determined based on reverberations caused by any discrete precipitate or particulate matter landing on or striking the protective element.

The above examples of signal components may be used in combination. Reverberations caused by, e.g., liquid droplets, landing on the protective element may be used in combination with variations in frequency of the resonance to determine the characteristic. In some examples of the method, the signal component associated with the reverberation may be a first signal component, and the method may further comprise identifying a second signal component that is associated with a resonance of a cavity delimited by the protective element, which may be perforated, and a housing of the microphone unit, the second signal component having a frequency depending on an extent to which perforations of the protective element are plugged by environmental material. Determining the characteristic may use the frequency of the second signal component and the determined rate of signal components that are associated with reverberations caused by liquid droplets landing on the protective element. By using this combination, the characteristic may be determined more accurately.

Processing an audio signal may comprise performing one or more analytic techniques on the audio signal. For example, processing the audio signal may comprise performing a Fourier transform on the audio signal. The Fourier transform may be a discrete Fourier transform (DFT) or a fast Fourier transform (FFT). The identified signal component may be a frequency domain component. Processing the audio signal may also comprise performing feature extraction on the audio signal. The processing of the audio signal may be based on one or more sliding windows. The audio signal or a portion thereof may be passed through one or more machine-learned models to perform said processing. The machine-learned model may for example be a convolutional neural network, a recursive convolutional neural network, or a transformer.

The characteristic may be a characteristic of rainfall in a vicinity of the vehicle. Rainfall in a vicinity of the vehicle may comprise rainfall on the vehicle or rainfall on a surface within a predetermined distance from the vehicle. The method may therefore be referred to as a method for detecting rainfall, optionally in the vicinity of a vehicle. The characteristic may comprise, for example, a value for a parameter associated with the rainfall. The parameter may be a droplet size, an intensity of the rainfall, or a direction of the rainfall. The intensity of the rainfall may be measured as a number of drops per second per unit of area. The intensity may be determined based on a number of drops per second observed across a known area of the protective element. The characteristic may comprise a category of a plurality of categories into which the rainfall falls. For example, the plurality of categories may comprise three categories, which may be, for example, light rain, medium rain, and heavy rain.

Although a microphone is referred to above, the techniques may applied using a plurality of microphones. The microphone unit may be a first microphone unit and the method may comprise receiving a second audio signal from a second microphone unit disposed on the vehicle. The second microphone unit may be separate from the first microphone unit. The second microphone unit may be oriented differently to the first microphone unit. For example, the first microphone unit may be provided on an end of the vehicle and the second microphone unit may be provided on a side of the vehicle, or each of the first and second microphone units may be provided on different ends or sides of the vehicle. The method may further comprise processing the first audio signal and the second audio signal to determine a direction of the rainfall relative to the vehicle. Determining the characteristic may comprise processing the first audio signal and the second audio signal to determine the direction of the rainfall relative to the vehicle. A direction of the rainfall relative to the vehicle may be determined based on differences between the signal components of the microphone units. For example, a microphone unit having a higher rate of signal components than the other may indicate that the rain is falling towards the microphone having the higher rate. In examples, a third microphone unit, a fourth microphone unit, and/or further microphone units that is differently oriented to the first and second microphone units may be used to determine the direction of the rainfall relative to the vehicle.

Of course, utilizing the microphone unit for determining rainfall or other environmental material may not preclude the microphone unit from being used for other functions. The method may comprise processing the audio signal to detect a siren in a vicinity of the vehicle. The method may comprise detecting a siren in the vicinity of the vehicle based on processing the audio signal.

Once the characteristic has been determined, it may be used to adapt how the vehicle is operated. The method may comprise controlling the vehicle and/or one or more components of the vehicle based on the characteristic. For example, the vehicle may be controlled according to a mode of operation based on the characteristic. The vehicle may be controlled to switch from a first mode of operation for operating the vehicle in dry conditions to a second mode of operation for operating the vehicle in wet conditions. The second mode of operation may for example cause the vehicle to drive more slowly, leave a greater gap to vehicles ahead, or implement other modified driving operations characteristic of more cautious driving due to a greater expected stopping distance. The extent of modification of the driving operations may depend on the characteristic of the detected rainfall, such as the intensity of the detected rainfall The method may comprise performing one or more actions based on the characteristic. For example, a message may be sent to one or more remote computing systems to indicate that the characteristic has been determined. The message may identify a map location associated with the characteristic. The remote computing system may be configured to communicate the characteristic and/or other information based on the characteristic to one or more other vehicles. The remote computing system may update a shared map based on the received map location data and the characteristic.

According to a further aspect, there may be provided one or more non-transitory computer-readable media. The one or more non-transitory computer-readable media stores instructions executable by one or more processors, wherein the instructions, when executed, cause the one or more processors to perform operations comprising a method as described above. According to a further aspect, there may be provided a system comprising a microphone unit for mounting on a vehicle, the microphone unit comprising a microphone and a protective element arranged to shield the microphone from environmental material, one or more processors, and one or more non-transitory computer-readable media storing instructions which, when executed by the one or more processors, cause the one or more processors to perform operations comprising a method as described above.

Turning now to the figures, FIG. 1 illustrates a scenario 100 in which a vehicle 102 is travelling along a road 104. The vehicle 102 may include a plurality of sensors 106. The plurality of sensors 106 may include a microphone unit 108. The microphone unit 108 may be mounted on the vehicle 102 at an end 110. Although not shown in FIG. 1, one or more further microphone units may be provided on the vehicle 102. Further microphone units may be mounted to other exterior surfaces of the vehicle 102, such as another end or a side of the vehicle. The microphone unit 108, as will be described in more detail in relation to FIGS. 2A-3B below, may include at least one microphone, a protective element, and a housing (not shown in FIG. 1). The vehicle 102 also comprises a computing system 112. An example of a computing system 112 is described below in relation to FIG. 9. The computing system 112 may comprise one or more processors (not shown) for performing computations. Although the computing system 112 in the present example is a component of the vehicle 102, it will be appreciated that in other examples, operations performed by the computing system 112 may be performed by a device or system remote from the vehicle 102.

The computing system 112 may be configured to perform a method or process to detect rainfall on the vehicle 102 or in a vicinity of the vehicle 102. The computing system 112 may be configured to, as part of the process, receive one or more audio signals 120 from the microphone of the microphone unit 108 and utilize the audio signals to detect the rainfall. The computing system 112 may also be configured to detect when it is not raining, based on the one or more audio signals 120.

The computing system 112 may utilize signal components of the one or more audio signals 120 to detect and characterize the rainfall. The computing system 112 may receive the one or more audio signals 120 and may perform processing on the one or more audio signals 120. As part of the processing, the computing system 112 may perform component identification 122 to identify one or more signal components from the audio signal(s) 120. The one or more signal components may be associated with a resonance of at least part of the microphone unit 108. Example signal components are described in relation to FIGS. 4A to 7B below. As will be described in relation to these figures, a signal component may comprise a particular resonance frequency, a frequency shift of a resonance, or a particular or signature feature of an audio signal such as a signal component associated with a reverberation caused by a liquid droplet landing on the protective element of the microphone unit 108.

Having identified one or more signal components, the computing system 112 may be configured to perform component analysis 124. The component analysis 124 may enable determination or identification of one or more characteristics indicative of the protective element of the microphone unit 108 having shielded the microphone from environmental material, such as rainfall. The computing system 112 may be configured to, based on the component analysis 124, determine characteristic data 126 indicative of the one or more characteristics. A characteristic may comprise a category of the rainfall and/or a value of a parameter associated with the rainfall. For example, the characteristic may comprise an effective intensity of the rainfall, an absolute intensity of the rainfall, and/or a direction of the rainfall.

In the scenario 100, the vehicle 102 is driving from a first region 140 in which no rain is falling to a second region 142 in which rain 144 is falling. In the first region 140, audio signals 120 picked up by the microphone(s) of the microphone unit 108 may be unaffected by rainfall. Accordingly, the computing system 112 may receive the audio signals 120 and may determine, based on the audio signals 120 and through the component identification 122 and component analysis 124, signal components that are indicative of no rainfall or may determine, based on the audio signals 120 and through the component identification 122, that no signal components indicative of rainfall are present. In either event, the computing system 1112 may subsequently determine that there is no rainfall on or in the vicinity of the vehicle 102, or that any such rainfall is below a threshold level.

In the second region 142, rain 144 may begin to fall on the end 110 of the vehicle 102 at which the microphone unit 108 is mounted. Raindrops forming the rain 144 may land on the protective element of the microphone unit 108. Rain that has fallen on the road surface may splash onto the protective element of the microphone unit 108. The protective element may shield the microphone of the microphone unit 108 from the raindrops or splashes. This shielding may be picked up in one or more microphones as one or more signal components. The computing system 112 may identify said signal components during component identification 122. The computing system 112 may then, via the component analysis 124, determine characteristic data 126 indicative of rainfall.

The computing system 112 may control the vehicle 102 based on determining the characteristic data 126 indicating the rainfall 144 in the second region 142. For example, the vehicle 102 may be an autonomous vehicle and a mode of operation may be changed based on the characteristic data 126. One or more windshield wipers and/or sensor cleaners may be activated or otherwise controlled based on determining the characteristic data 126. Alternatively, or additionally, the computing system 112 may perform one or more other actions, such as sending a message to a remote computing including the characteristic data 126.

Figure 2A:
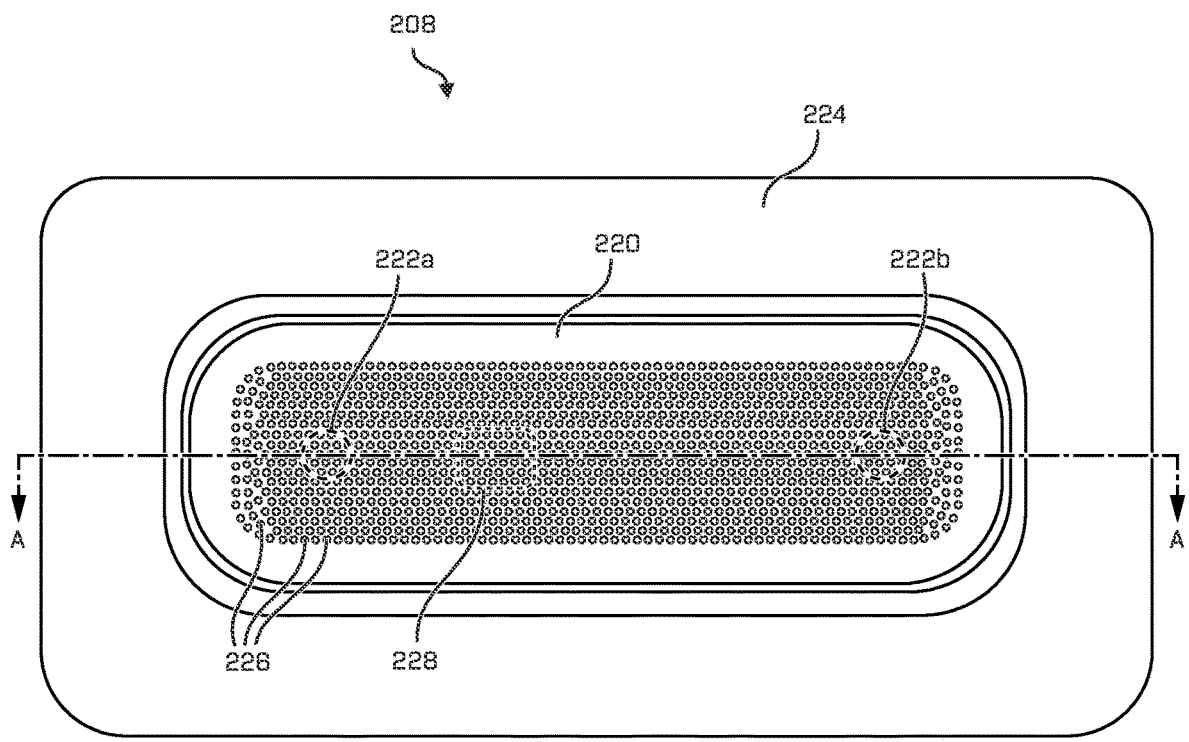
FIGS. 2A and 2B depict features of an exterior microphone according to the present invention.

FIG. 2A shows a front view of a microphone unit 208. The microphone unit 208 may be mounted on a vehicle, such as vehicle 102, and used as described above in relation to microphone unit 108. FIG. 2A illustrates a protective element 220 of the microphone unit 208. The protective element 220 may cover one or more microphones of the microphone unit 208, and in the example of FIG. 2A, the microphone unit 208 includes two microphones. The positions of the two microphones are indicated in FIG. 2A as position 222a of a first microphone and position 222b of a second microphone, as the microphones themselves are obscured by the protective element 220. The microphone unit 208 may also include a housing 224 that holds the protective element 220 in a position to protect the microphones.

Figure 2B:
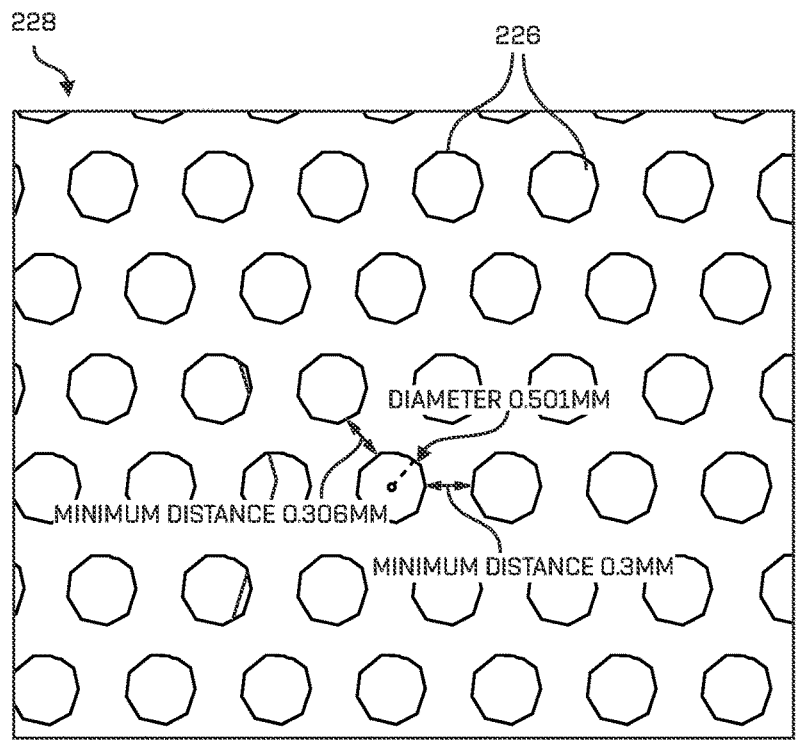

The protective element 220 may be arranged to allow sound to pass through it or around it. The protective element may comprise a plurality of perforations 226 and may comprise a mesh or grill. FIG. 2B illustrates a portion 228 of the protective element 220 that has been enlarged so that the perforations 226 and the distances between them can be identified. As illustrated in FIG. 2B, the perforations 226 have a uniform diameter of approximately 0.5 mm and are arranged on a hexagonal lattice with a spacing such that any two perforations 226 are separated by a minimum distance of 0.3 mm. Perforations 226 of this size may allow sound to travel through the protective element 220 to reach the one or more microphones of the microphone unit 208 whilst also preventing any substantial ingress of water or other debris or environmental material. It will be appreciated that other arrangements and/or dimensions of perforations, or other types of protective element, may be used.

Figure 3A:
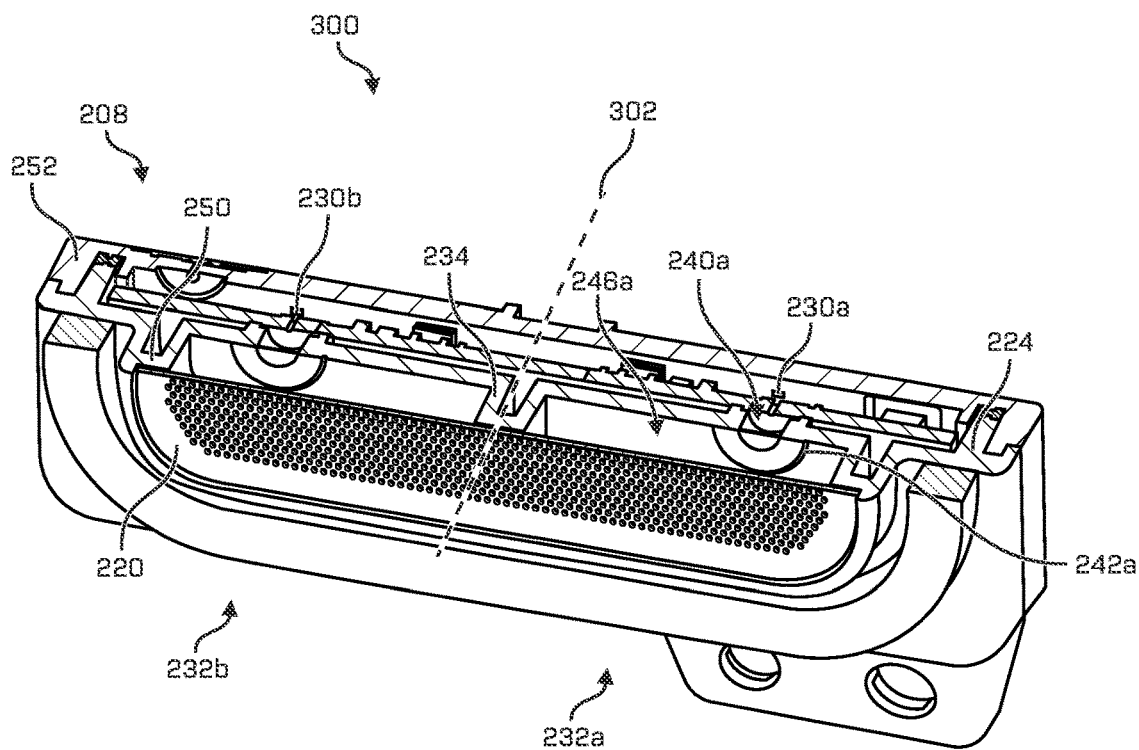
FIGS. 3A and 3B depict sections of an exterior microphone according to the present invention.
Figure 3B:
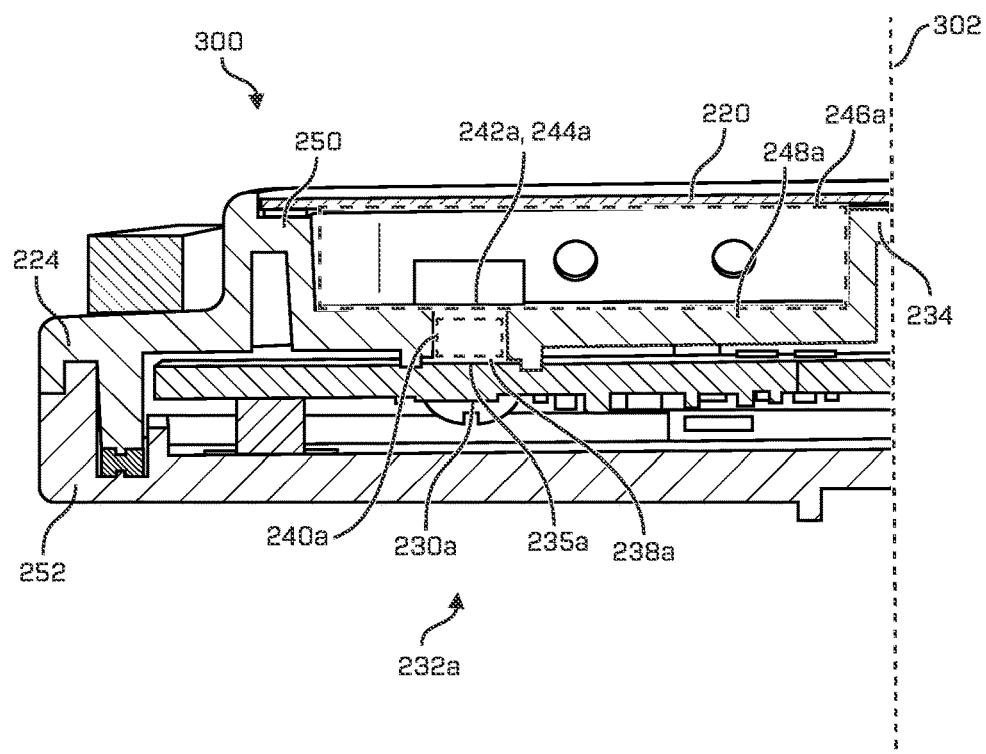

FIG. 3A shows a perspective view of a cross section 300 of the microphone unit 208 along the line A-A (shown in FIG. 2A). FIG. 3B shows a plan view of one half of the cross section 300 of the microphone unit 208. The half of the cross section 300 shown in FIG. 3B is the half of the microphone unit 208 to the right of line 302. The microphone unit 208 has mirror symmetry about the line 302, so only one half of the microphone unit 208 is described in relation to FIG. 3B for clarity. The description in relation to FIG. 3B below may equally be applied to the other half of the microphone unit 208.

The microphone unit 208 may comprise a first microphone 230a and a second microphone 230b. The microphones 230a, 230b may be MEMS microphones. In examples, the microphones 230a, 230b may be a different type of microphone. The microphones 230a, 230b may be piezoelectric microphones, condenser microphones, dynamic microphones, or any other type of microphones.

Each microphone 230a, 230b may be provided in a respective portion 232a, 232b of the microphone unit 208. The portions are separated by a central support 234 of the housing 224. Only one portion 232a is shown in FIG. 3B.

Considering the portion 232a shown in FIG. 3B, the microphone 230a may be provided at least partially within an aperture 236a of the housing 224. The aperture 236a may be fluidly connected to a first end 238a of a first cavity 240a, which may be cylindrical in shape, delimited by the housing 224. A vent 242a may at least partially cover a second end 244a of the first cavity 240, which may be opposite the first end 238a. The vent 242a may be covered by a hydrophobic weave or other suitable material that allows air to pass through the vent 242a but prevents liquid from passing through the vent 242a to reach the microphone 230a. The first cavity 240 may be fluidly connected at its second end 244a to a second cavity 246a that is delimited by the housing 224 and the protective element 220. The second cavity 246a may be delimited by a recessed portion 248a of the housing 224. The protective element 220 may be fixed to the housing 224 above the recessed portion 248a by a shoulder portion 250 of the housing 224. The microphone unit 208 also includes a mount 252 by which the microphone unit 208 may be mounted to or attached to a vehicle.

The first and second cavities 240a, 246a are indicated with dotted lines in FIG. 3B. The first cavity 240a may have a smaller volume than the second cavity 246a. In use, two Helmholtz resonators may be formed respectively by the cavities 240a, 246a. A Helmholtz resonator may be modeled as a mass-spring system, in which air inside the cavity plays the role of the spring and air passing through an opening of the cavity plays the role of the mass. A first Helmholtz resonator may be formed by the first cavity 240a and the vent 242a, where air passing through the vent 242a may act as the mass of the mass-spring system and the compressed air in the cavity 240a may act as the spring in the mass-spring system. A second Helmholtz resonator may be formed by the second cavity 246a and the perforations 226 in the protective element 220, where air passing through the perforations 226 may act as the mass of the mass-spring system and the compressed air in the cavity 246a may act as the spring in the mass-spring system. Although the above description considers the portion 232a, the elements may be the same for the portion 232b.

Helmholtz resonators may have a resonance at a resonance frequency, just as a mass-spring system may have a resonance at a resonance frequency. At the resonance frequency, an increased amplitude may be observed. Such resonances may be observed in the microphone unit 208.

Figure 4A:
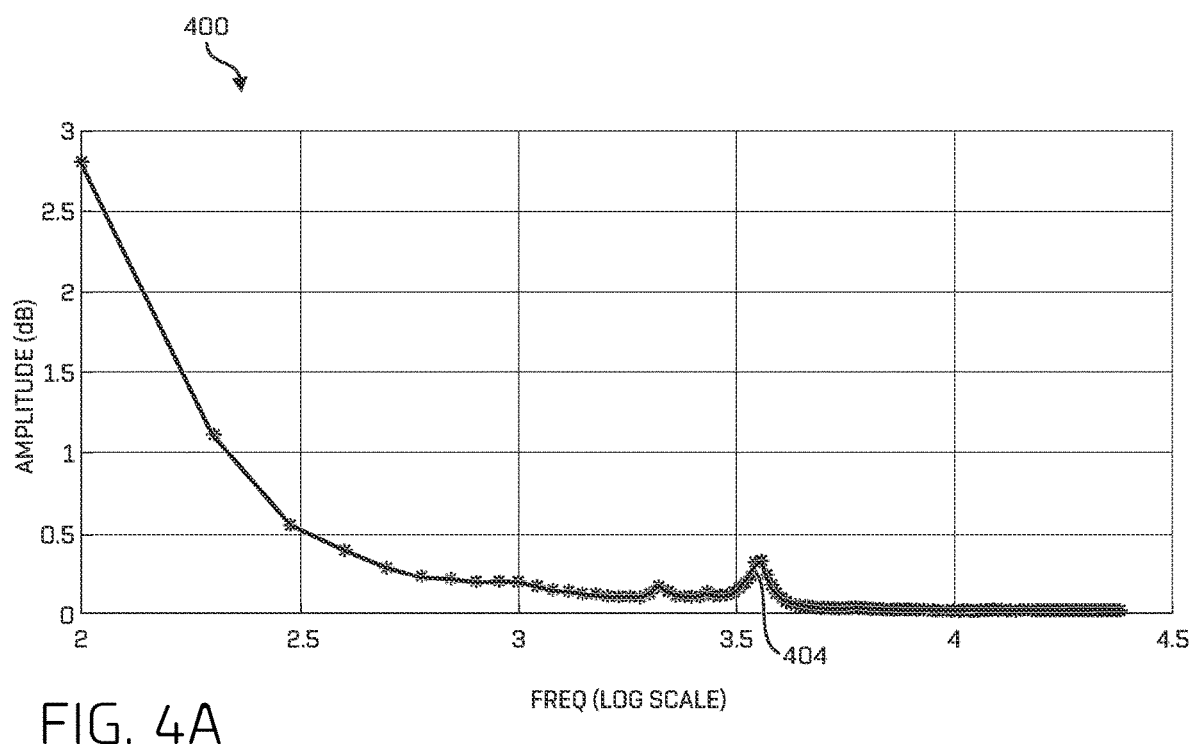
FIGS. 4A and 4B depict frequency responses of an exterior microphone in dry conditions at low speed and high speed respectively.
Figure 4B:
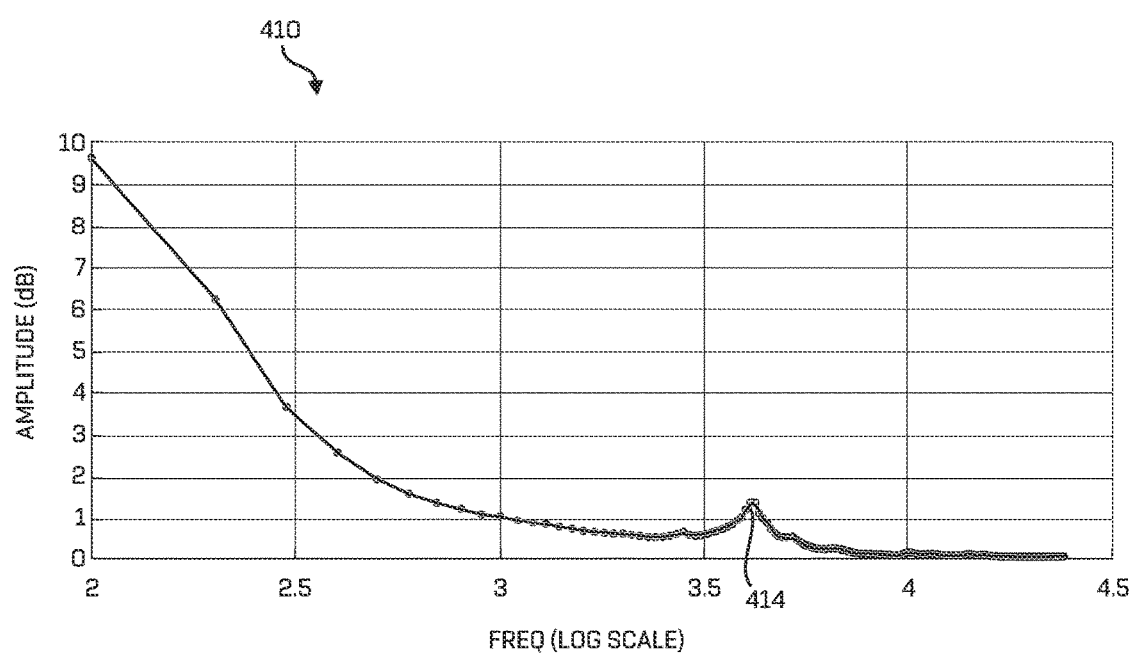

FIGS. 4A and 4B show frequency spectra 400, 410 for an exemplary microphone unit, such as the microphone unit 208. FIG. 4A indicates an averaged frequency spectrum 400 from an audio signal obtained from the exemplary microphone unit mounted to a vehicle travelling in dry conditions at slow speed (slow speed in this example may be below approximately 3.5 m/s). FIG. 4B indicates an averaged frequency spectrum 410 from an audio signal obtained from the exemplary microphone unit mounted to a vehicle travelling in similar, dry conditions at higher speed (high speed in this example may be above approximately 8 m/s).

As can be seen in both FIGS. 4A and 4B, a large spike 402, 412 is exhibited at low frequencies, which may correspond to the microphone unit picking up engine and other low-frequency noise created by the vehicle. Other than the low-frequency spike, a resonance 404, 414 is found in each spectrum 400, 410 at 6 800 Hz. The resonances 404, 414 may be due to the resonance of the volume of air in one or both of the cavities of the microphone unit, as a Helmholtz resonator. FIGS. 4A and 4B demonstrate that the speed at which the vehicle is travelling does not influence the observed resonance 404, 414, in dry conditions.

FIGS. 5A to 6B provide examples of measurements made using a microphone mounted on a front surface of a vehicle in wet conditions. To obtain these measurements, a vehicle was driven at different speeds along a route while rain was falling and an audio signal was obtained for the journey from a microphone unit, such as the microphone unit 208, mounted to the vehicle. By travelling at different speeds, the surface of the vehicle on which the microphone unit is disposed was subjected to different effective rain rates.

Figure 5A:
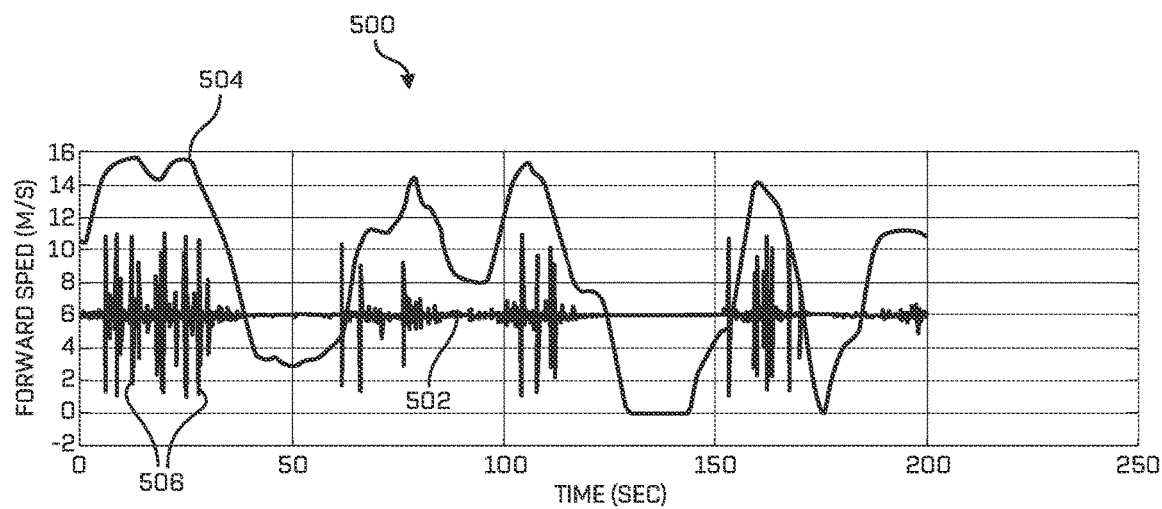
FIGS. 5A and 5B depict an audio signal of an exterior microphone at different speeds and a frequency response of the audio signal respectively.

Looking first at the chart 500 in FIG. 5A, an audio signal 502 is indicated recorded over 200 seconds. A forward speed 504 of the vehicle at each point along the audio signal is also indicated. Between approximately 0 seconds and 30 seconds, the vehicle is travelling at high speed, between 10 m/s and 16 m/s. At 30 seconds, the vehicle decelerates to a low speed of approximately 4 m/s until 60 seconds, after which the vehicle accelerates again to speeds of 8 m/s and 16 m/s until approximately 120 seconds. Between 130 seconds and 145 seconds the vehicle is stationary, and so travelling at 0 m/s. The vehicle then accelerates again to high speed and stops again until 200 seconds.

Figure 5B:
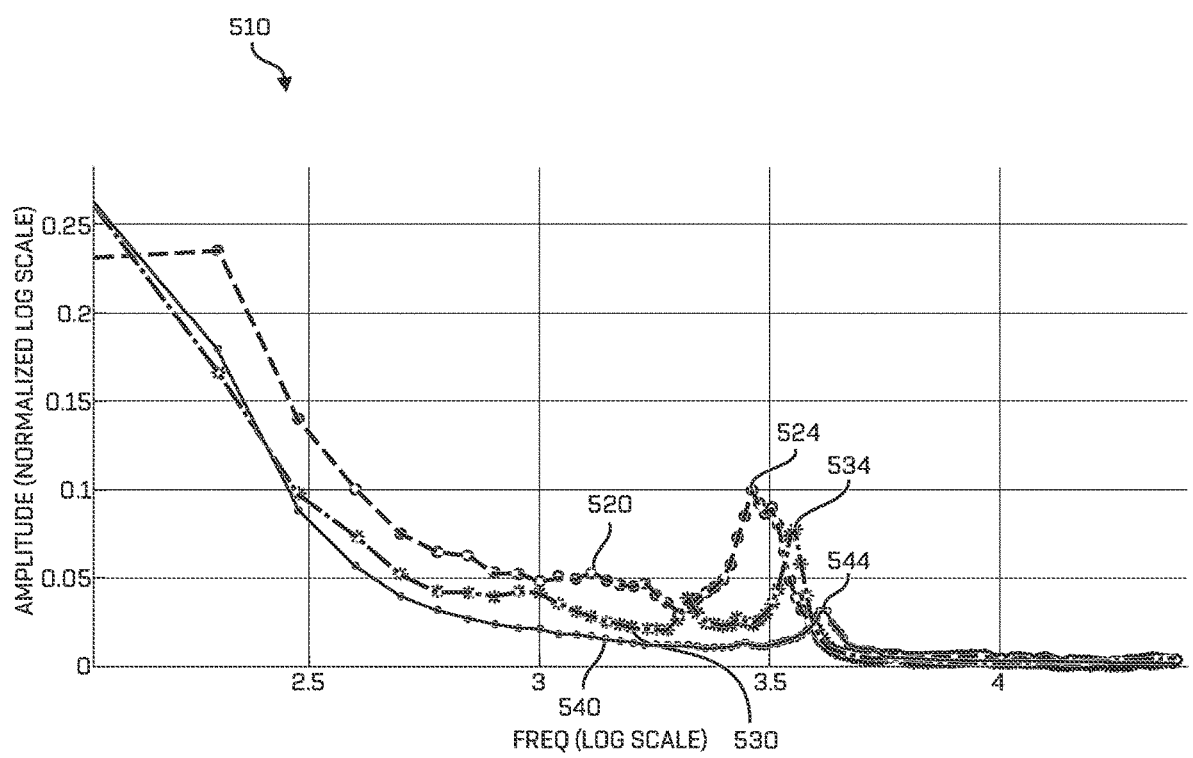

FIG. 5B provides a chart 510 showing overlaid frequency spectra 520, 530, 540 for three different speeds of the vehicle, based on the audio signal 502 and the corresponding forward speeds 504. The spectra 520, 530, 540 are determined by performing DFTs or FFTs on successive 10 ms subintervals of the audio signal 502 and averaging the resulting spectra over three separate intervals corresponding to the three different speed regimes. A first frequency spectrum 520 is provided for when the vehicle was stationary at 0 m/s. A second frequency spectrum 530 is provided for when the vehicle was travelling at low speeds, averaging approximately 3.4 m/s. A third frequency spectrum 540 is provided for when the vehicle was traveling at high speed, averaging approximately 15 m/s.

Each spectrum 520, 530, 540 exhibits a similar spike 522, 532, 542 at low frequencies to the spikes 402, 412 shown in FIGS. 4A and 4B. Each spectrum 520, 530, 540 also exhibits a resonance 524, 534, 544.

As can be seen in the first frequency spectrum 520, when the vehicle is stationary and in rainy conditions, the resonance 524 is lower than the resonance 404, 414 of the microphone unit in dry conditions. The resonance 524 is at approximately 2700 Hz rather than 6 800 Hz. The resonance 524 may be lower than the resonances 404, 414 due to the rain. In rainy conditions, water droplets may plug or fill one or more perforations of the protective element. The volume of the air in the cavity may remain the same, but the effective mass of the Helmholtz resonator may be increased due to the water in the perforations. Accordingly, the resonance frequency may reduce.

Water may plug more of the perforations of the protective element when the vehicle is stationary. Movement of the vehicle may cause unplugging of the perforations, as may raindrops landing on the protective element. As a result, on average, a higher vehicle speed may result in a higher resonance frequency. This is shown in both the second and third spectra 530, 540, where the resonance frequencies 534, 544 are increased to approximately 3400 Hz and 3900 Hz respectively. These values still remain significantly lower than the resonance frequency in dry conditions.

FIGS. 4A, 4B, and 5B demonstrate that the resonance frequency of a microphone unit may be used to identify different effective rain rates. If the speed or velocity of the vehicle is further provided (for example determined using odometry, global positioning system (GPS), or any other suitable means), then the resonance frequency and the velocity of the vehicle may be used to infer an absolute (or actual) rain rate in the vicinity of the vehicle, i.e., a rain rate as would be measured in a stationary reference frame.

In further examples, a plurality of microphone units may be mounted on different parts of the vehicle, such as at both ends of the vehicle and on both sides of the vehicle. The different microphone units, and in particular the protective elements of the different microphone units, may face in different directions depending on which parts of the vehicle they are mounted on. Each of the microphone units may be used to capture audio signals and the captured audio signals may be analyzed to identify signal components. In such cases, additional characteristics of rainfall, such as effective rain direction and/or effective horizontal rain velocity, may be determined based at least in part on differences between the resonance frequencies measure for the different microphone units. In such cases, an absolute rain direction or absolute horizontal rain velocity may be inferred by further providing the velocity of the vehicle, for example by subtracting a vector representing the velocity of the vehicle from a vector representing the effective horizontal velocity of the rainfall.

FIG. 5A exhibits a plurality of impulses 506 in the audio signal 502, particularly when the vehicle is travelling at a higher speed. These impulses 506 are also observed during low-speed travel, although these are not visible in FIG. 5A due to the scale. When the vehicle is stationary, these impulses 506 are not observed. The impulses 506 correspond to rain or water landing on the protective element. Although not shown in these figures, a resonance of the microphone unit may change after each impulse, indicating that there is a change in how much of the protective element is plugged with water.

When rain is falling at a higher effective rate, a frequency or a rate of the impulses over time may be higher than when rain is falling at a lower effective rate, because more raindrops are likely to land on the protective element. A higher effective rate may be caused by the vehicle travelling more quickly and/or by heavier rainfall. Accordingly, a characteristic of rainfall may be determined based on how often these impulses are observed.

Figure 6A:
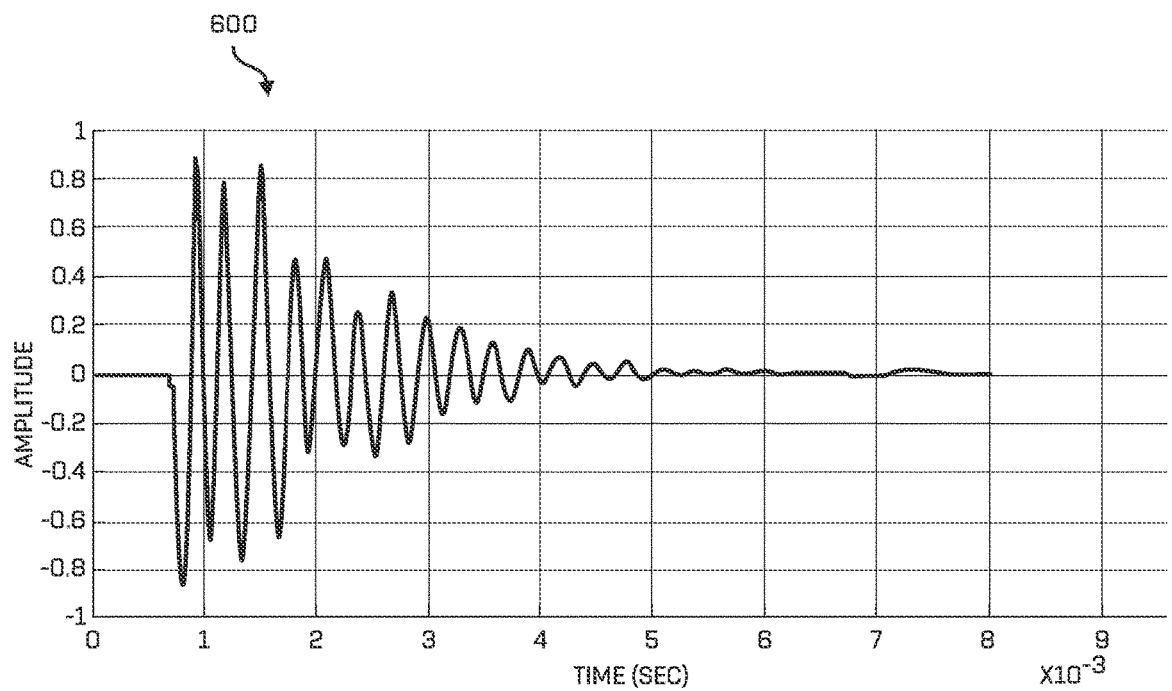
FIGS. 6A and 6B depict an audio signal of a rain impact on an exterior microphone at low speed and a frequency response of the audio signal respectively.
Figure 6B:
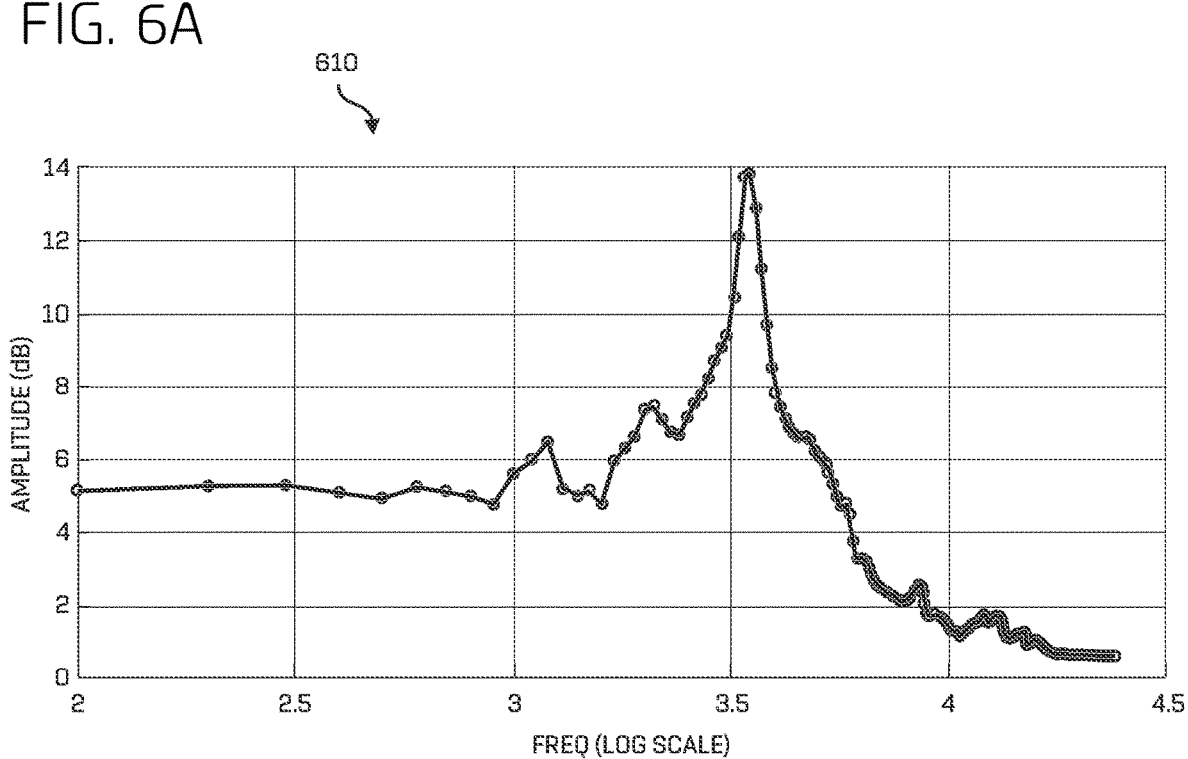

An example of a portion 600 of the audio signal 502 correlating to an impulse 506 is shown in FIG. 6A, and a frequency spectrum 610 obtained by performing an FFT on the portion 600 is show in FIG. 6B.

In FIG. 6A, it can be seen that a raindrop landing on the protective element has a signature signal associated with it. In each of these examples, the signature signal may be described as a damped oscillation that lasts approximately three milliseconds. The raindrops and/or the protective element exhibit a reverberation or ringing, which may have a frequency corresponding to a resonance frequency of the partially plugged cavity of the microphone unit, indicating that the reverberation results from the raindrop exciting the resonance of the cavity.

The different resonances, the impulses or reverberations due to the raindrops landing on the protective element, and the changes in resonance due to the changes in the water present on or in the perforations of the protective element may be utilized to quantify or categorize different types of rain. Portions of features of the audio signal corresponding to resonances, impulses, or changes in resonance may be referred to as signal components, and/or may be derived from signal components. The signal components may be time domain components or frequency domain components. The signal components may be identified using any suitable signal processing methods, for example thresholding, narrowband filtering, and/or by applying machine-learned classifiers or regression models trained to detect or identify signal components. Examples of machine-learned models that may be used for this purpose include convolutional neural networks (CNNs), recurrent CNNs (R-CNNs), or transformers, any of which may be configured to identify signal components from a suitable representation of an audio signal, such as a time domain representation, a frequency domain representation, or a combined representation such as a Mel-frequency cepstrum (MFC) representation. In further examples, a machine-learned model may additionally, or alternatively, be used to determine one or more characteristics of rainfall based on features of detected audio signal components. For example, a neural network may be trained using supervised learning to take as inputs one or more features of signal components identified within audio signals from one or more microphones, optionally along with other variables such as vehicle velocity, to generate outputs corresponding to one or more characteristics of rainfall, such as an effective rain rate, an absolute rain rate, a horizontal rain direction, a horizontal rain velocity, and/or a type of precipitation (such as rain, hail, sleet or snow). In still further examples, a machine-learned model may be trained to process representations of audio signals from one or more microphones, optionally along with other variables such as vehicle velocity, to directly determine characteristics of rainfall. In an example where such a machine-learned model includes a neural network, the neural network may learn to identify features of audio signal components as an intermediate operation within one or more network layers.

Although machine-learned models may be used to implement various steps of the methods disclosed herein, alternative approaches such as heuristic methods may be employed in the alternative, or in tandem with machine-learned models. Such methods may provide an additional advantage of relatively low processing and memory demands. For example, as discussed above, an estimate of an effective rain rate on a microphone unit may be estimated from an average rate of detected signal components that correspond to raindrops striking the microphone unit. A further estimate of the effective rain rate may be determined by monitoring the resonance frequency of the microphone unit. As explained above, impacts from water droplets can cause plugging or unplugging of perforations in the protective mesh, resulting in changes to the resonance frequency. The average rate at which the resonance frequency jumps between different values may be used as an additional or alternative indicator of the effective rain rate.

An example of a heuristic method may include estimating an absolute rain rate based at least in part on an effective rain rate falling on one or more microphone units, and information relating to the velocity of the vehicle and/or raindrops. In this regard, the effective rain rate falling on a microphone unit may be dependent on the absolute rain rate and a velocity of the raindrops relative to the microphone unit. By further providing or determining information indicative of this relative velocity, the effective rain rate may therefore be converted to an absolute rain rate. The conversion from effective rain rate and relative velocity to absolute rain rate may be performed based on a theoretical or empirically derived relationship. For example, the effective rain rate may be proportional to a component of the relative velocity and the absolute rain rate. In other examples, the relationship between the effective rain rate, the absolute rain rate, and the velocity may differ from a proportional relationship, for example following a general linear relationship or any other empirically or theoretically derived functional relationship. It will be appreciated that in cases where a horizontal speed of rainfall is significant compared with the speed of the vehicle (for example due to wind), then the absolute or relative horizontal velocity of the rainfall may be used in addition to the velocity of the vehicle to determine the absolute rain rate from the effective rain rate. For this purpose, additional information may be provided, such as a measured windspeed and/or data from other microphones as explained below.

In some examples, the average frequency shift of a resonance within a temporal window may be used to determine a characteristic of rainfall. For example, a relationship between the average resonance frequency and the speed of the vehicle in the normal direction of the microphone unit may be used to estimate the absolute rain rate. The average resonance frequency for a given vehicle speed may depend on the absolute or effective rain rate, as these affect the frequency of plugging and unplugging events that have a net effect of varying the resonance frequency as described above. The relationship between vehicle speed and resonance frequency may for example take the form of a linear or other polynomial relationship with coefficients depending on the absolute or effective rain rate. By monitoring the resonance frequency and the speed of the vehicle, best-fit values of the coefficients may be determined either in a pointwise manner or based on rates of change, from which the absolute or effective rain rate may be estimated. The relationship between the coefficients and the rain rate may be determined empirically during a calibration phase. Again, in cases where a horizontal speed of rainfall is significant compared with the speed of the vehicle, the horizontal velocity of the rainfall may also be accounted for in the relationship, for example by replacing the vehicle speed with a relative horizontal rainfall speed.

In some examples, information determined from one microphone may be combined with similar determinations from other microphones to determine a characteristic of rainfall. In this regard, determinations of effective rain rate from different microphone units facing in different directions may be combined to determine rain direction or horizontal rain velocity relative to the vehicle. For example, using signals from two microphone units facing in mutually perpendicular directions (such as parallel and perpendicular to a forward direction of the vehicle), the direction of rainfall relative to the vehicle may be determined as a ratio of effective rain rates estimated from the two microphones, or components of the horizontal rain velocity relative to the vehicle may be determined from the effective rain rates determined from the respective microphone units. In another example, comparing the resonance frequencies of microphone units at a leading and trailing end of the vehicle may be used to determine a frequency shift caused by rain drops falling on the microphone unit. Furthermore, estimates of rainfall characteristics from different microphone units may be averaged or otherwise combined or fused to provide a more accurate determination. For example, variations in average resonance frequency measured from multiple microphone units, combined with the velocity of the vehicle, may be used to determine characteristics including the absolute rain rate and horizontal velocity or direction of rainfall. Furthermore, if determinations of a given characteristic differ significantly between different microphone units, then it may be inferred that such determinations do not result from rainfall but from a different process such as splashing or otherwise blocking of the protective mesh one of the microphone units. In this case, further operations may be carried out, for example generating an alert or performing an action to clean one or more of the microphone units.

Estimates or data determined from any or all of the above methods may be averaged or otherwise combined or fused to determine a more accurate determination of one or more characteristics of rainfall.

Figure 7:
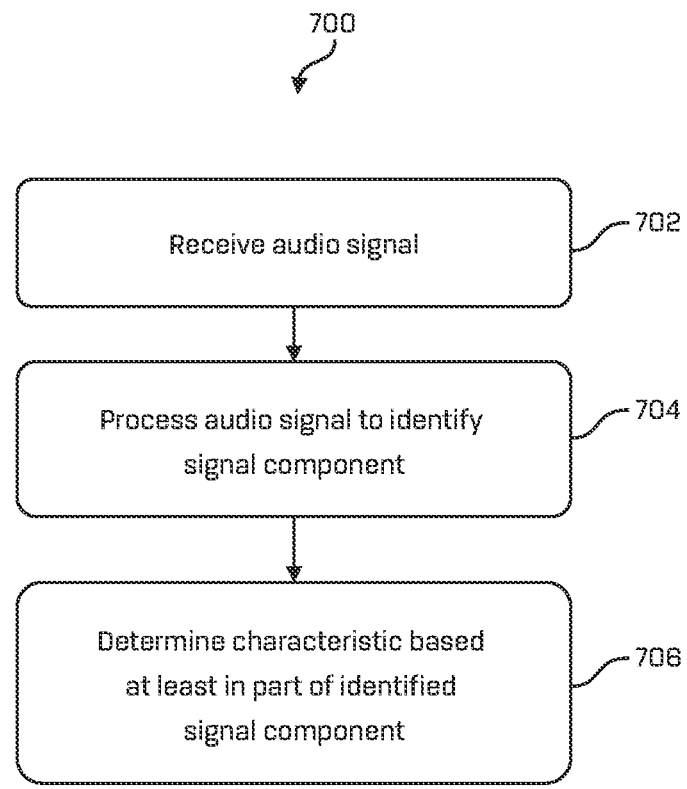
FIG. 7 depicts a flow chart of a process for detecting rain using an exterior microphone according to the present invention.

Based on the above, a generalized method may be defined, an example of which is shown by FIG. 7. The method may be generally applied to detecting environmental material, and may be specifically applied to detecting rainfall. The method 800700 of FIG. 7 includes, at a first step 802702, receiving an audio signal from a microphone.

At a second step 804704, the method 800700 may comprise processing the audio signal to identify a signal component that is associated with a resonance of at least part of the microphone unit. The signal component may be associated with a resonance of a cavity of the microphone unit. The signal component may be associated with a reverberation caused by a raindrop or other environmental material landing on a protective element of a microphone unit.

At a third step 806706, the method 800700 may comprise determining, based at least in part on the identified signal component, a characteristic indicative of the protective element having shielded the microphone from environmental material. The characteristic may be based directly on the resonances and/or reverberations, but there may be intermediate steps in some examples. For example, one or more frequency shifts of the resonance may be determined, either relative to a previous resonance or relative to a reference frequency, and the characteristic may be based on the frequency shift. The characteristic may be determined based on a speed and/or direction of the vehicle. In some examples, a rate of reverberations may be determined, and the characteristic may be determined based on the rate of reverberations.

The characteristic may comprise a determination that rain is falling, a determination of an intensity of the rain, a determination of a category of rain, a detection of water striking the protective element indicative of a splash from a puddle or pool, a determination of a direction of rain relative to the vehicle, or a determination of a size of one or more raindrops landing on the protective element.

Although the description in relation to FIGS. 1-7 is provided relative to an audio signal or signals from one microphone of a microphone unit, in other examples audio signals from two or more microphones may be used in combination. Using a microphone unit having a plurality of microphones, such as the microphone unit 208 of FIGS. 2A to 3B that includes two microphones 230*a*, 230*b*, audio signals from different microphones may be used and processed to determine independently whether rainfall is detected. Based on the analysis of the audio signals from the different microphones, it may be determined whether there is a correlation and that rain is detected. For example, both microphones may exhibit similar resonances, similar changes in resonance, and/or similar raindrop reverberations, and based on such similarities, it may be confirmed that both microphones are detecting rainfall, and that rainfall is therefore detected.

In some examples, a computing system may, based on the determined characteristic, determine a confidence score for the characteristic. The confidence score may be dependent on an amount of data on which the characteristic is based, a speed of the vehicle during determination of the characteristic, a level of background noise, or one or more other factors. Furthermore, to determine a characteristic and/or a confidence score in the determined characteristic, the computing system may combine information from different types of resonance and/or based on different analysis techniques. For example, information determined from a frequency shift of a Helmholtz resonance may be combined with information determined from a rate of reverberations caused by liquid droplets striking a protective element. The resulting characteristic may be determined by averaging or by any other suitable multi-input operation, and the associated confidence score may be determined based on a variance between different estimates of the characteristic. The resulting characteristic, and optionally the associated confidence score, may be determined using Bayesian statistics. In some examples, different estimates of the characteristic may be fused using a machine-learned model, such as a neural network model trained by supervised learning to estimate the characteristic based on multiple input values.

Figure 8:
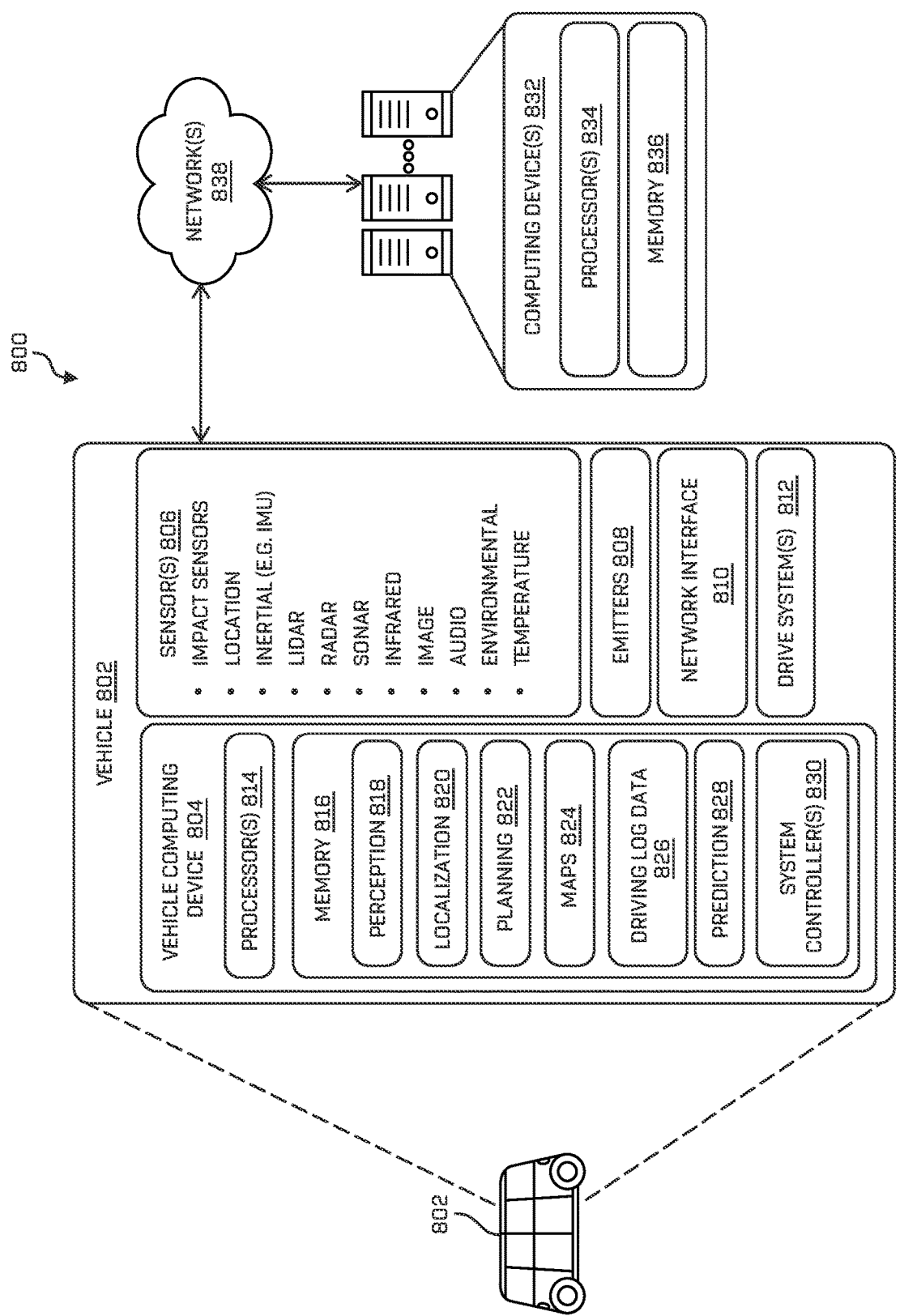
FIG. 8 is a block diagram illustrating an example vehicle system according to the present invention.

FIG. 8 illustrates a block diagram of an example system 800 that implements the techniques discussed herein. FIG. 8 may represent the vehicle 102 and computing device 112 of FIG. 1. In some instances, the example system 800 may include a vehicle 802, which may represent the vehicle 102 in FIG. 1. In some instances, the vehicle 802 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 802 may be a fully or partially autonomous vehicle having any other level or classification. Moreover, in some instances, the techniques described herein may be usable by non-autonomous vehicles as well.

The vehicle 802 may include a vehicle computing device(s) 804, sensor(s) 806, emitter(s) 808, network interface(s) 810, and/or drive system(s) 812. Sensor(s) 806 may represent sensor(s) 106. The system 800 may additionally or alternatively comprise computing device(s) 832.

In some instances, the sensor(s) 806 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 806 may include multiple instances of each of these or other types of sensors. For instance, the radar sensors may include individual radar sensors located at the corners, front, back, sides, and/or top of the vehicle 802. As another example, the cameras may include multiple cameras disposed at various locations about the exterior and/or interior of the vehicle 802. The sensor(s) 806 may provide input to the vehicle computing device(s) 804 and/or to computing device(s) 832.

The vehicle 802 may also include emitter(s) 808 for emitting light and/or sound, as described above. The emitter(s) 808 may include interior audio and visual emitter(s) to communicate with passengers of the vehicle 802. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 808 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 802 may also include network interface(s) 810 that enable communication between the vehicle 802 and one or more other local or remote computing device(s). The network interface(s) 810 may facilitate communication with other local computing device(s) on the vehicle 802 and/or the drive component(s) 812. The network interface(s) 810 may additionally or alternatively allow the vehicle to communicate with other nearby computing device(s) (e.g., other nearby vehicles, traffic signals, etc.). The network interface(s) 810 may additionally or alternatively enable the vehicle 802 to communicate with computing device(s) 832 over a network 828. In some examples, computing device(s) 832 may comprise one or more nodes of a distributed computing system (e.g., a cloud computing architecture).

The vehicle 802 may include one or more drive components 812. In some instances, the vehicle 802 may have a single drive component 812. In some instances, the drive component(s) 812 may include one or more sensors to detect conditions of the drive component(s) 812 and/or the surroundings of the vehicle 802. By way of example and not limitation, the sensor(s) of the drive component(s) 812 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 812. In some cases, the sensor(s) on the drive component(s) 812 may overlap or supplement corresponding systems of the vehicle 802 (e.g., sensor(s) 806).

The drive component(s) 812 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 812 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 812. Furthermore, the drive component(s) 812 may also include one or more communication connection(s) that enable communication by the respective drive component with one or more other local or remote computing device(s).

The vehicle computing device(s) 804 may include processor(s) 814 and memory 816 communicatively coupled with the one or more processors 814. Computing device(s)

832 may also include processor(s) 834, and/or memory 836. The processor(s) 814 and/or 834 may be any suitable processor capable of executing instructions to process data and perform operations as described herein. By way of example and not limitation, the processor(s) 814 and/or 834 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 816 and/or 836 may be examples of non-transitory computer-readable media. The memory 816 and/or 836 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 816 and/or memory 836 may store a perception component 818, localization component 820, planning component 822, map(s) 824, driving log data 826, prediction component 828, and/or system controller(s) 830—zero or more portions of any of which may be hardware, such as GPU(s), CPU(s), and/or other processing units.

The perception component 818 may detect object(s) in in an environment surrounding the vehicle 802 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 818 is referred to as perception data. The perception component 818 may be configured to associate a bounding region (or other indication) with an identified object. The perception component 818 may be configured to associate a confidence score associated with a classification of the identified object with an identified object. In some examples, objects, when rendered via a display, can be colored based on their perceived class. The object classifications determined by the perception component 818 may distinguish between different object types such as, for example, a passenger vehicle, a pedestrian, a bicyclist, motorist, a delivery truck, a semi-truck, traffic signage, and/or the like.

In at least one example, the localization component 820 may include hardware and/or software to receive data from the sensor(s) 806 to determine a position, velocity, and/or orientation of the vehicle 802 (e.g., one or more of an x-, y-, z-position, roll, pitch, or yaw). For example, the localization component 820 may include and/or request/receive map(s) 824 of an environment and can continuously determine a location, velocity, and/or orientation of the autonomous vehicle 802 within the map(s) 824. In some instances, the localization component 820 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 820 may provide data to various components of the vehicle 802 to determine an initial position of an autonomous vehicle for generating a trajectory and/or for generating map data, as discussed herein. In some examples, localization component 820 may provide, to the perception component 818, a location and/or orientation of the vehicle 802 relative to the environment and/or sensor data associated therewith.

The planning component 822 may receive a location and/or orientation of the vehicle 802 from the localization component 820 and/or perception data from the perception component 818 and may determine instructions for controlling operation of the vehicle 802 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 830 and/or drive component(s) 812 may parse/cause to be carried out, second instructions for the emitter(s) 808 may be formatted according to a second format associated therewith).

The driving log data 826 may comprise sensor data, perception data, and/or scenario labels collected/determined by the vehicle 802 (e.g., by the perception component 818), as well as any other message generated and or sent by the vehicle 802 during operation including, but not limited to, control messages, error messages, etc. In some examples, the vehicle 802 may transmit the driving log data 826 to the computing device(s) 832.

The prediction component 828 may generate one or more probability maps representing prediction probabilities of possible locations of one or more objects in an environment. For example, the prediction component 828 may generate one or more probability maps for vehicles, pedestrians, animals, and the like within a threshold distance from the vehicle 802. In some examples, the prediction component 828 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 822 may be communicatively coupled to the prediction component 828 to generate predicted trajectories of objects in an environment. For example, the prediction component 828 may generate one or more predicted trajectories for objects within a threshold distance from the vehicle 802. In some examples, the prediction component 828 may measure a trace of an object and generate a trajectory for the object based on observed and predicted behavior. Although prediction component 828 is shown on a vehicle 802 in this example, the prediction component 828 may also be provided elsewhere, such as in a remote computing device. In some examples, a prediction component may be provided at both a vehicle and a remote computing device. These components may be configured to operate according to the same or a similar algorithm.

The memory 816 and/or 836 may additionally or alternatively store a mapping system, a planning system, a ride management system, etc. Although perception component 818 and/or planning component 822 are illustrated as being stored in memory 816, perception component 818 and/or planning component 822 may include processor-executable instructions, machine-learned model(s) (e.g., a neural network), and/or hardware.

As described herein, the localization component 820, the perception component 818, the planning component 822, and/or other components of the system 800 may comprise one or more ML models. For example, the localization component 820, the perception component 818, and/or the planning component 822 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 820 may additionally or alternatively store one or more system controller(s) 830, which may be configured to control steering, propulsion, braking, safety, emitters, communication, and other systems of the vehicle 802. These system controller(s) 830 may communicate with and/or control corresponding systems of the drive component(s) 812 and/or other components of the vehicle 802.

It should be noted that while FIG. 8 is illustrated as a distributed system, in alternative examples, components of the vehicle 802 may be associated with the computing device(s) 832 and/or components of the computing device(s) 832 may be associated with the vehicle 802. That is, the vehicle 802 may perform one or more of the functions associated with the computing device(s) 832, and vice versa.

EXAMPLE CLAUSES

A system comprising: a microphone unit for mounting on a vehicle, the microphone unit comprising a housing, a microphone, and a protective mesh arranged to shield the microphone from environmental material, wherein the housing and the protective mesh delimit a cavity of the microphone unit; one or more processors; and one or more non-transitory computer-readable media storing instructions which, when executed by the one or more processors, cause the one or more processors to perform operations comprising: receiving an audio signal from the microphone; processing the audio signal to identify a signal component that is associated with a resonance of the cavity of the microphone unit, the identified signal component having a frequency depending on an extent to which perforations of the protective mesh are plugged by water; and determining, based at least in part on the frequency of the identified signal component, a characteristic quantifying rainfall in a vicinity of the vehicle.

B: The system of clause A, wherein: the operations comprise determining a rate at which the frequency of the identified signal component changes due to variations in the extent to which the perforations of the protective mesh are plugged by water; and the determining of the characteristic is based at least in part on the determined rate at which at which the frequency of the identified signal component changes.

C: The system of clause A or B, wherein: the operations comprise: determining an average frequency of the signal component within a temporal window; and obtaining data indicating a speed of the vehicle within the temporal window; and the determining of the characteristic uses the determined average frequency and the indicated speed of the vehicle.

D: The system of any of clauses A to C, wherein: the signal component is a first signal component; the operations further comprise identifying, within the audio signal, second signal components that are associated with reverberations caused by water droplets landing on the protective mesh; the operations comprise determining an occurrence rate of the second signal components; and the determining of the characteristic further uses the determined occurrence rate of the second signal components.

E: A method comprising: receiving an audio signal from a microphone; processing the audio signal to identify a signal component that is associated with a resonance of at least part of a microphone unit disposed on a vehicle, the microphone unit comprising the microphone and a protective element arranged to shield the microphone from environmental material; and determining, based at least in part on the identified signal components, a characteristic indicative of the protective element having shielded the microphone from environmental material.

F: The method of clause E, wherein: the protective element is perforated; the identified signal component is associated with a resonance of a cavity delimited by the protective element and a housing of the microphone unit; the identified signal component has a frequency depending on an extent to which perforations of the protective element are plugged by environmental material; and the determining of the characteristic is based at least in part on the frequency of the identified signal component.

G: The method of clause F, wherein: the method comprises determining a rate at which the frequency of the identified signal component changes due to variations in the extent to which the perforations of the protective mesh are plugged by water; and the determining of the characteristic is based at least in part on the determined rate at which at which the frequency of the identified signal component changes due to variations in the extent to which the perforations of the protective mesh are plugged by water.

H: The method of clause F or G, wherein: the method further comprises: determining an average frequency of the identified signal component within a temporal window; and obtaining data indicating a speed of the vehicle within the temporal window; and the determining of the characteristic uses the determined average frequency and the indicated speed of the vehicle.

I: The method of clause E, wherein: the signal component is associated with a reverberation caused by a liquid droplet landing on the protective element; the method comprises determining an occurrence rate of signal components that are associated with reverberations caused by liquid droplets landing on the protective element; and the determining of the characteristic uses the determined occurrence rate of the signal components that are associated with reverberations caused by liquid droplets landing on the protective element.

J: The method of clause I, wherein: the signal component is a first signal component; and the method further comprises identifying a second signal component that is associated with a resonance of a cavity delimited by the protective element and a housing of the microphone unit, the second signal component having a frequency depending on an extent to which perforations of the protective element are plugged by environmental material; and the determining of the characteristic is further based on the frequency of the second signal components.

K: The method of any of clauses E to J, wherein the characteristic is a characteristic of rainfall in a vicinity of the vehicle.

L: The method of clause K, wherein the microphone unit is a first microphone unit; and the method comprises: receiving a second audio signal from a second microphone unit disposed on the vehicle and oriented differently to the first microphone unit; and processing the first audio signal and the second audio signal to determine a direction of the rainfall relative to the vehicle.

M: The method of any of clauses E to K, comprising processing the audio signal to detect a siren in a vicinity of the vehicle.

N: One or more non-transitory computer-readable media storing instructions executable by one or more processors, wherein the instructions, when executed, cause the one or more processors to perform operations comprising: receiving an audio signal from a microphone; processing the audio signal to identify a signal component that is associated with a resonance of at least part of a microphone unit disposed on a vehicle, the microphone unit comprising the microphone and a protective element arranged to shield the microphone from environmental material; and determining, based at least in part on the identified signal components, a characteristic indicative of the protective element having shielded the microphone from environmental material.

O: The one or more non-transitory computer-readable storage media of clause N, wherein: the protective element is perforated; the identified signal component is associated with a resonance of a cavity delimited by the protective element and a housing of the microphone unit; the identified signal component has a frequency depending on an extent to which perforations of the protective element are plugged by environmental material; and the determining of the characteristic is based at least in part on the frequency of the identified signal component.

P: The one or more non-transitory computer-readable storage media of clause O, wherein: the operations comprise determining a rate at which the frequency of the identified signal component changes due to variations in the extent to which the perforations of the protective mesh are plugged by water; and the determining of the characteristic is based at least in part on the determined rate at which at which the frequency of the identified signal component changes due to variations in the extent to which the perforations of the protective mesh are plugged by water.

Q: The one or more non-transitory computer-readable storage media of clause O or P, wherein: the operations further comprise: determining an average frequency of the identified signal component within a temporal window; and obtaining data indicating a speed of the vehicle within the temporal window; and the determining of the characteristic uses the determined average frequency and the indicated speed of the vehicle.

R: The one or more non-transitory computer-readable storage media of clause N, wherein: the signal component is associated with a reverberation caused by a liquid droplet landing on the protective element; the operations comprise determining an occurrence rate of signal components that are associated with reverberations caused by liquid droplets landing on the protective element; and the determining of the characteristic uses the determined occurrence rate of the signal components that are associated with reverberations caused by liquid droplets landing on the protective element.

S: The one or more non-transitory computer-readable storage media of any of clauses N to R, wherein the characteristic is a characteristic of rainfall in a vicinity of the vehicle.

T: The one or more non-transitory computer-readable storage media of any of clauses N to S, wherein the microphone unit is a first microphone unit; and the operations comprise: receiving a second audio signal from a second microphone unit disposed on the vehicle and oriented differently to the first microphone unit; and processing the first audio signal and the second audio signal to determine a direction of the rainfall relative to the vehicle.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
a microphone unit for mounting on a vehicle, the microphone unit comprising a housing, a microphone, and a protective mesh arranged to shield the microphone from environmental material, wherein the housing and the protective mesh delimit a cavity of the microphone unit;
one or more processors; and
one or more non-transitory computer-readable media storing instructions which, when executed by the one or more processors, cause the one or more processors to perform operations comprising:
receiving an audio signal from the microphone;
processing the audio signal to identify a signal component that is associated with a resonance of the cavity of the microphone unit, the identified signal component having a frequency depending on an extent to which perforations of the protective mesh are plugged by water; and
determining, based at least in part on the frequency of the identified signal component, a characteristic quantifying rainfall in a vicinity of the vehicle.

2. The system of claim 1, wherein:
the operations comprise determining a rate at which the frequency of the identified signal component changes due to variations in the extent to which the perforations of the protective mesh are plugged by water; and
the determining of the characteristic is based at least in part on the determined rate at which at which the frequency of the identified signal component changes.

3. The system of claim 1, wherein:
the operations comprise:
  determining an average frequency of the signal component within a temporal window; and
  obtaining data indicating a speed of the vehicle within the temporal window; and
the determining of the characteristic uses the determined average frequency and the indicated speed of the vehicle.

4. The system of claim 1, wherein:
the signal component is a first signal component;
the operations further comprise identifying, within the audio signal, second signal components that are associated with reverberations caused by water droplets landing on the protective mesh;
the operations comprise determining an occurrence rate of the second signal components; and
the determining of the characteristic further uses the determined occurrence rate of the second signal components.

5. A method comprising:
receiving an audio signal from a microphone;
processing the audio signal to identify a signal component that is associated with a resonance of at least part of a microphone unit disposed on a vehicle, the microphone unit comprising the microphone and a protective element arranged to shield the microphone from environmental material; and
determining, based at least in part on the identified signal components, a characteristic indicative of the protective element having shielded the microphone from environmental material.

6. The method of claim 5, wherein:
the protective element is perforated;
the identified signal component is associated with a resonance of a cavity delimited by the protective element and a housing of the microphone unit;
the identified signal component has a frequency depending on an extent to which perforations of the protective element are plugged by environmental material; and
the determining of the characteristic is based at least in part on the frequency of the identified signal component.

7. The method of claim 6, wherein:
the method comprises determining a rate at which the frequency of the identified signal component changes due to variations in the extent to which the perforations of the protective mesh are plugged by water; and
the determining of the characteristic is based at least in part on the determined rate at which at which the frequency of the identified signal component changes due to variations in the extent to which the perforations of the protective mesh are plugged by water.

8. The method of claim 6, wherein:
the method further comprises:
  determining an average frequency of the identified signal component within a temporal window; and
  obtaining data indicating a speed of the vehicle within the temporal window; and
the determining of the characteristic uses the determined average frequency and the indicated speed of the vehicle.

9. The method of claim 5, wherein:
the signal component is associated with a reverberation caused by a liquid droplet landing on the protective element;
the method comprises determining an occurrence rate of signal components that are associated with reverberations caused by liquid droplets landing on the protective element; and
the determining of the characteristic uses the determined occurrence rate of the signal components that are associated with reverberations caused by liquid droplets landing on the protective element.

10. The method of claim 9, wherein:
the signal component is a first signal component; and
the method further comprises identifying a second signal component that is associated with a resonance of a cavity delimited by the protective element and a housing of the microphone unit, the second signal component having a frequency depending on an extent to which perforations of the protective element are plugged by environmental material; and
the determining of the characteristic is further based on the frequency of the second signal components.

11. The method of claim 5, wherein the characteristic is a characteristic of rainfall in a vicinity of the vehicle.

12. The method of claim 11, wherein:
the microphone unit is a first microphone unit; and
the method comprises:
  receiving a second audio signal from a second microphone unit disposed on the vehicle and oriented differently to the first microphone unit; and
  processing the first audio signal and the second audio signal to determine a direction of the rainfall relative to the vehicle.

13. The method of claim 5, comprising processing the audio signal to detect a siren in a vicinity of the vehicle.

14. One or more non-transitory computer-readable media storing instructions executable by one or more processors, wherein the instructions, when executed, cause the one or more processors to perform operations comprising:
receiving an audio signal from a microphone;
processing the audio signal to identify a signal component that is associated with a resonance of at least part of a microphone unit disposed on a vehicle, the microphone unit comprising the microphone and a protective element arranged to shield the microphone from environmental material; and
determining, based at least in part on the identified signal component, a characteristic indicative of the protective element having shielded the microphone from environmental material.

15. The one or more non-transitory computer-readable storage media of claim 14, wherein:
the protective element is perforated;
the identified signal components are associated with a resonance of a cavity delimited by the protective element and a housing of the microphone unit;
the identified signal component has a frequency depending on an extent to which perforations of the protective element are plugged by environmental material; and
the determining of the characteristic is based at least in part on the frequency of the identified signal component.

16. The one or more non-transitory computer-readable storage media of claim 15, wherein:
the operations comprise determining a rate at which the frequency of the identified signal component changes due to variations in the extent to which the perforations of the protective mesh are plugged by water; and
the determining of the characteristic is based at least in part on the determined rate at which at which the frequency of the identified signal component changes due to variations in the extent to which the perforations of the protective mesh are plugged by water.

17. The one or more non-transitory computer-readable storage media of claim 16, wherein:
the operations further comprise:
  determining an average frequency of the identified signal component within a temporal window; and
  obtaining data indicating a speed of the vehicle within the temporal window; and
determining the characteristic uses the determined average frequency shift.

18. The one or more non-transitory computer-readable storage media of claim 14, wherein:
the signal components is associated with a reverberation caused by a liquid droplets landing on the protective element;
the operations comprise determining an occurrence rate of signal components that are associated with reverberations caused by liquid droplets landing on the protective element; and
the determining of the characteristic uses the determined occurrence rate of signal components that are associated with reverberations caused by liquid droplets landing on the protective element.

19. The one or more non-transitory computer-readable storage media of claim 14, wherein the characteristic is a characteristic of rainfall in a vicinity of the vehicle.

20. The one or more non-transitory computer-readable storage media of claim 19, wherein:
the microphone unit is a first microphone unit; and
the operations comprise:
  receiving a second audio signal from a second microphone unit disposed on the vehicle and oriented differently to the first microphone unit; and
  processing the first audio signal and the second audio signal to determine a direction of the rainfall relative to the vehicle.

* * * * *